United States Patent
Kanatsu et al.

(10) Patent No.: US 8,503,773 B2
(45) Date of Patent: Aug. 6, 2013

(54) GLYPH SELECTION AND ELECTRONIC DOCUMENT GENERATION

(75) Inventors: Tomotoshi Kanatsu, Tokyo (JP); Makoto Enomoto, Kawasaki (JP); Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 12/599,802

(22) PCT Filed: Jun. 23, 2008

(86) PCT No.: PCT/JP2008/061781
§ 371 (c)(1),
(2), (4) Date: Nov. 11, 2009

(87) PCT Pub. No.: WO2009/005019
PCT Pub. Date: Jan. 8, 2009

(65) Prior Publication Data
US 2010/0232690 A1    Sep. 16, 2010

(30) Foreign Application Priority Data
Jun. 29, 2007  (JP) .................................. 2007-172737

(51) Int. Cl.
G06K 9/00        (2006.01)
G06K 9/46        (2006.01)

(52) U.S. Cl.
USPC ......................................... 382/165; 382/203

(58) Field of Classification Search
None
See application file for complete search history.

(56) References Cited

U.S. PATENT DOCUMENTS

| 5,164,900 | A | 11/1992 | Bernath |
| 5,680,479 | A | 10/1997 | Wang et al. |
| 5,689,620 | A | 11/1997 | Kopec et al. |
| 5,872,574 | A | 2/1999 | Hara et al. |
| 5,933,249 | A | 8/1999 | Shimura et al. |
| 6,006,226 | A | 12/1999 | Cullen et al. |
| 6,501,475 | B1 * | 12/2002 | Cheng ........................... 345/467 |
| 6,522,330 | B2 | 2/2003 | Kobayashi |
| 6,788,810 | B2 | 9/2004 | Fujiwara |

(Continued)

FOREIGN PATENT DOCUMENTS

| DE | 19522394 A | 1/1997 |
| EP | 0755019 A | 1/1997 |

(Continued)

OTHER PUBLICATIONS

European Search Report dated Jun. 24, 2010 in corresponding European Patent Application No. 08777694.4.

(Continued)

*Primary Examiner* — Nirav G Patel
(74) *Attorney, Agent, or Firm* — Fitzpatrick, Cella, Harper & Scinto

(57) ABSTRACT

An image processing apparatus includes a character recognition unit configured to perform character recognition on a plurality of character images in a document image to acquire a character code corresponding to each character image, and a generation unit configured to generate an electronic document, wherein the electronic document includes the document image, a plurality of character codes acquired by the character recognition unit, a plurality of glyphs, and data which indicates the glyphs to be used to render each of the character codes, wherein each of the plurality of glyphs is shared and used by different character codes based on the data when rendering characters that correspond to the plurality of character codes acquired by the recognition unit.

29 Claims, 16 Drawing Sheets

U.S. PATENT DOCUMENTS

| | | | |
|---|---|---|---|
| 6,970,601 | B1 | 11/2005 | Kaneda et al. |
| 7,133,565 | B2 | 11/2006 | Toda et al. |
| 7,310,769 | B1 * | 12/2007 | Dash .............................. 715/269 |
| 7,349,577 | B2 | 3/2008 | Kaneda et al. |
| 7,391,917 | B2 | 6/2008 | Ohta et al. |
| 7,519,226 | B2 | 4/2009 | Kaneda et al. |
| 7,903,266 | B2 * | 3/2011 | Arsenault et al. ............ 358/1.11 |
| 8,077,971 | B2 | 12/2011 | Enomoto et al. |
| 2002/0076111 | A1 | 6/2002 | Dance et al. |
| 2003/0123727 | A1 | 7/2003 | Kanatsu |
| 2004/0088657 | A1 * | 5/2004 | Brown et al. .................. 715/542 |
| 2005/0180645 | A1 * | 8/2005 | Hasegawa et al. ............ 382/239 |
| 2006/0045386 | A1 | 3/2006 | Fukuoka et al. |
| 2008/0178067 | A1 * | 7/2008 | Lahman et al. ............... 715/200 |
| 2009/0154810 | A1 | 6/2009 | Enomoto et al. |

FOREIGN PATENT DOCUMENTS

| | | | |
|---|---|---|---|
| JP | 6068301 | A | 3/1994 |
| JP | 7236062 | A | 9/1995 |
| JP | 10063776 | A * | 3/1998 |
| JP | 10162024 | A | 6/1998 |
| JP | 10289226 | A | 10/1998 |
| JP | 11-232276 | A | 8/1999 |
| JP | 2000322417 | A | 11/2000 |
| JP | 2002077633 | A | 3/2002 |
| JP | 2005012768 | A | 1/2005 |
| JP | 2005275863 | A | 6/2005 |
| JP | 2005-259017 | A | 9/2005 |
| WO | 2009005019 | A1 | 8/2009 |

OTHER PUBLICATIONS

European Search Report dated Jun. 29, 2010 in corresponding European Patent Application No. 08777687.8.

Office Action dated Feb. 22, 2011 in U.S. Appl. No. 12/439,994.

PCT International Search Report and Written Opinion of the International Searching Authority, mailed Aug. 19, 2008, in PCT/JP2008/061781.

Japanese Office Action dated Oct. 2, 2012 concerning Japanese Patent Application No. 2010-193846.

Office Action dated Feb. 5, 2013 in U.S. Appl. No. 13/299,283.

* cited by examiner

FIG. 6

```
601 { <?xml version="1.0"?>
      <Document>
602 {   <Page Width="1680" Height="2376" Dpi="200" Number="1">
603 {     <Image X="0" Y="0" Width="1680" Height="2376"
                 Data="ACAf49sw89q34rs6dbc23cfasx....a3E52zAD"/>
604 {     <Text X="236" Y="272" Font="Font01" Size="97"
                Color="0,0,0,255" String="0x2358,0x2332,0x2341"
                CGlyphId="1,6,3"/>
605 {     <Text X="236" Y="472" Font="Font01" Size="92"
                Color="0,0,0,255" String="0x2359,0x2342,0x2363"
                CGlyphId="0,2,5"/>
606 {   </Page>

607 {   <Page Width="1680" Height="2376" Dpi="200" Number="2">
608 {     <Image X="0" Y="0" Width="1680" Height="2376"
                 Data="sa8OAN2qx7sa23Basd2x....aAqw8D2dDJ"/>
609 {     <Text X="136" Y="872" Font="Font01" Size="92"
                Color="0,0,0,255" String="0x242b,0x242d,0x242f"
                CGlyphId="1,1,6"/>
610 {   </Page>

<Font Id="Font01">
         <Glyph Id="0" Path="M0,0 V-1024 H1024 V1024 f" />
         <Glyph Id="1" Path="M0,0 V-1024 H896 V1024 f" />
         <Glyph Id="2" Path="M0,0 V-1024 H768 V1024 f" />
         <Glyph Id="3" Path="M0,0 V-1024 H640 V1024 f" />
611 {    <Glyph Id="4" Path="M0,0 V-1024 H512 V1024 f" />
         <Glyph Id="5" Path="M0,0 V-1024 H384 V1024 f" />
         <Glyph Id="6" Path="M0,0 V-1024 H256 V1024 f" />
         <Glyph Id="7" Path="M0,0 V-1024 H128 V1024 f" />
       </Font>
612 { </Document>
```

FIG. 9

| REGION | x | y | width | height | TYPE |
|---|---|---|---|---|---|
| 1 | 236 | 272 | 260 | 292 | TEXT |
| 2 | 634 | 1264 | 898 | 830 | PHOTOGRAPH |

FIG. 11

| CHARACTER | x | y | width | height | CHARACTER WIDTH/RAW HEIGHT | CODE |
|---|---|---|---|---|---|---|
| 1 | 236 | 272 | 80 | 97 | 0.82 | 0x2358 |
| 2 | 339 | 284 | 14 | 75 | 0.14 | 0x2332 |
| 3 | 401 | 274 | 55 | 75 | 0.57 | 0x2341 |

1101

| CHARACTER | x | y | width | height | CHARACTER WIDTH/RAW HEIGHT | CODE |
|---|---|---|---|---|---|---|
| 1 | 236 | 474 | 92 | 85 | 1.00 | 0x2359 |
| 2 | 348 | 472 | 58 | 92 | 0.63 | 0x2342 |
| 3 | 428 | 472 | 28 | 89 | 0.30 | 0x2363 |

| No. | CHARACTER CODE | DESCRIPTION POSITION |
|---|---|---|
| 0 | 0x2358 | 1093 |
| 1 | 0x2332 | 1100 |
| 2 | 0x2341 | 1107 |
| 3 | 0x2359 | 1250 |
| 4 | 0x2342 | 1257 |
| 5 | 0x2363 | 1264 |
| 6 | 0x242b | 2601 |
| 7 | 0x242d | 2608 |
| 8 | 0x242f | 2615 |

FIG. 14A

```
<?xml version="1.0"?>
<Document>
 <Page Width="1680" Height="2376" Dpi="200" Number="1">
  <Image X="0" Y="0" Width="1680" Height="2376"
         Data="ACAf49sw89q34rs6dbc23cfasx....a3E52zAD"/>
  <Text X="236" Y="272" Font="Font01" Size="97"
         Color="0,0,0,255" String="0x2358,0x2332,0x2341"
         CGlyphId="1,6,3"/>
  <Text X="236" Y="472" Font="Font01" Size="92"
         Color="0,0,0,255" String="0x2359,0x2342,0x2363"
         CGlyphId="0,2,5"/>
 </Page>
 <Font Id="Font01">
  <Glyph Id="0" Path="M-896,0 V-128 H1024 V128 f" />
  <Glyph Id="1" Path="M-896,0 V-128 H896 V128 f" />
  <Glyph Id="2" Path="M-896,0 V-128 H768 V128 f" />
  <Glyph Id="3" Path="M-896,0 V-128 H640 V128 f" />
  <Glyph Id="4" Path="M-896,0 V-128 H512 V128 f" />
  <Glyph Id="5" Path="M-896,0 V-128 H384 V128 f" />
  <Glyph Id="6" Path="M-896,0 V-128 H256 V128 f" />
  <Glyph Id="7" Path="M-896,0 V-128 H128 V128 f" />
 </Font>
</Document>
```

FIG. 14B

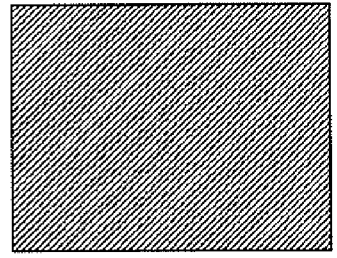

GLYPH SELECTION AND ELECTRONIC DOCUMENT GENERATION

TECHNICAL FIELD

The present invention relates to technique of converting a scanned image of a paper document into electronically searchable data.

BACKGROUND ART

In recent years, widespread use of scanners and large-scale storage devices such as a hard disk has lead to scanning of documents that have been preserved on paper and storing the scanned data as electronic documents. In addition, character recognition can be also performed on such image data acquired by scanning a paper document, so that character information included in the document is read and stored in association with the image. A user can thus search such an electronic document with which character information is associated using a search keyword. It is important that a keyword search can be performed on a scanned image as described above when a desired document is to be quickly searched from a large amount of stored documents.

For example, Japanese Patent Application Laid-Open No. 2000-322417 discusses highlighting a portion where a search keyword is included in a document image, in a case where a user performs a keyword search on an electronic document which is associated with character information as described above. The portion is highlighted so that the user can recognize the portion where the search keyword is included. Therefore, the user can efficiently recognize the portions where the keyword is included by switching page images, even in a case where there is a plurality of portions in which the same keyword is included in the document.

On the other hand, there is a technique of embedding a result of character recognition as a transparent text (i.e., a character code in which a transparent color is designated as a rendering color) in an image file. The image file is then stored in a portable document format (PDF). When such a PDF file is displayed, a transparent text is rendered on the character image in the document image. Therefore, when a user performs a keyword search, the transparent text is searched. However, since the user cannot see the transparent text, it looks as if the image is being searched. As a result, an image that is searchable by a search keyword can be rendered, based on a file whose format is described by a page description language which can render images and characters.

In an electronic document described in a page description language such as PDF or selectable vector graphics (SVG), character shape information of each character, that is, glyph of font data, is necessary to render characters. However, since the size of font data is generally large, a font type is usually designated in an electronic document instead of storing font data to keep the size of the electronic document small. As a result, a font that is installed in a personal computer (PC) can be used when characters are rendered using an application.

On the other hand, there are cases where it is desirable to store font data in the electronic document. For example, an electronic document created using a document creation application cannot be correctly opened on a different PC if the font data used in the electronic document is not installed in the PC. In other words, if font data itself is stored in an electronic document, the electronic document can be correctly reproduced with respect to a PC or an application in which the designated font data is not installed.

Further, depending on usage, there are cases where it is desirable to require storing of font data used in character rendering in an electronic document. For example, a font installed in a PC as a default may change due to a change in the operation system (OS). Therefore, it is desirable to require storing of font data in a long-term storage file.

Further, there are formats that require storing of font data in an electronic document. For example, when a text data is stored in an extensible markup language (XML) paper specification (XPS) format, the font data is required to be stored with the text data.

However, when a font data is stored in an electronic document, the size of the electronic document increases. If the file size of an electronic document increases, it takes more time to send the electronic document on a network, or a larger storage capacity will be required when storing the electronic document.

Thus, it is desirable to prevent an increase in the file size of an electronic document of a file format that uses font data stored in the electronic document to render characters. In particular, it is desirable to prevent an increase in the file size in a case where a scanned image, text data which is a character recognition result, and font data to be used in text rendering are stored together in an electronic document. An increase in the file size can become a problem if font data is required to be stored in an electronic document due to a restriction in a format or on a system.

Further, in a case where a character recognition result is to be embedded in a document image as a transparent text, it is desirable to correctly match a rendering position of the transparent text and a position of the corresponding character image in the document image. By matching the positions, the position of the searched text matches the position of the character image when the text is searched. To realize such a correct matching, the rendering position of the transparent text (e.g., position coordinate of a character, character width, or character spacing) needs to be designated in detail for each character. However, it the position of each character is described separately for all characters, the file size of the electronic document to be generated becomes large, particularly in a case where there are a large number of characters.

DISCLOSURE OF INVENTION

Embodiments of the invention provide an image processing apparatus that matches a rendering position of a transparent text with a position of a character image that corresponds to the transparent text in a document image, and creates an electronic document of a reduced file size.

According to an aspect of the present invention, an image processing apparatus includes a character recognition unit configured to perform character recognition on a plurality of character images in a document image to acquire a character code corresponding to each character image, and a generation unit configured to generate an electronic document, wherein the electronic document includes the document image, a plurality of character codes acquired by the character recognition unit, a plurality of glyphs, and data which indicates the glyphs to be used to render each of the character codes, wherein each of the plurality of glyphs is shared and used by different character codes based on the data when rendering characters that correspond to the plurality of character codes acquired by the recognition unit.

According to an exemplary embodiment of the present invention, a rendering position of a transparent text and a position of each character, image in a document image can be matched by selecting a glyph used in rendering the text.

Further, a plurality of glyphs of simple character shape (e.g., a rectangle) of different character widths are prepared and, shared and used to render various character types. Therefore, an amount of data to be described becomes small, and the file size of an electronic document can be reduced even in a case where a font data is required to be stored in the electronic document.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of an electronic document that is generated by an image processing apparatus according to the first exemplary embodiment of the present invention.

FIG. 9 illustrates an example of region data generated as a result of the region segmentation process according to the first exemplary embodiment of the present invention.

FIG. 11 illustrates an example of character code string data that are generated as a result of the character recognition process according to the first exemplary embodiment of the present invention.

FIG. 12 illustrates an example of a character code sequence table according to the first exemplary embodiment of the present invention.

FIGS. 14A and 14B illustrate an example of a page display in which a search result is highlighted using a different highlighting process according to the first exemplary embodiment of the present invention.

BEST MODE FOR CARRYING OUT THE INVENTION

Various exemplary embodiments, features, and aspects of the invention will be described in detail below with reference to the drawings.

First Exemplary Embodiment

Figure 1:
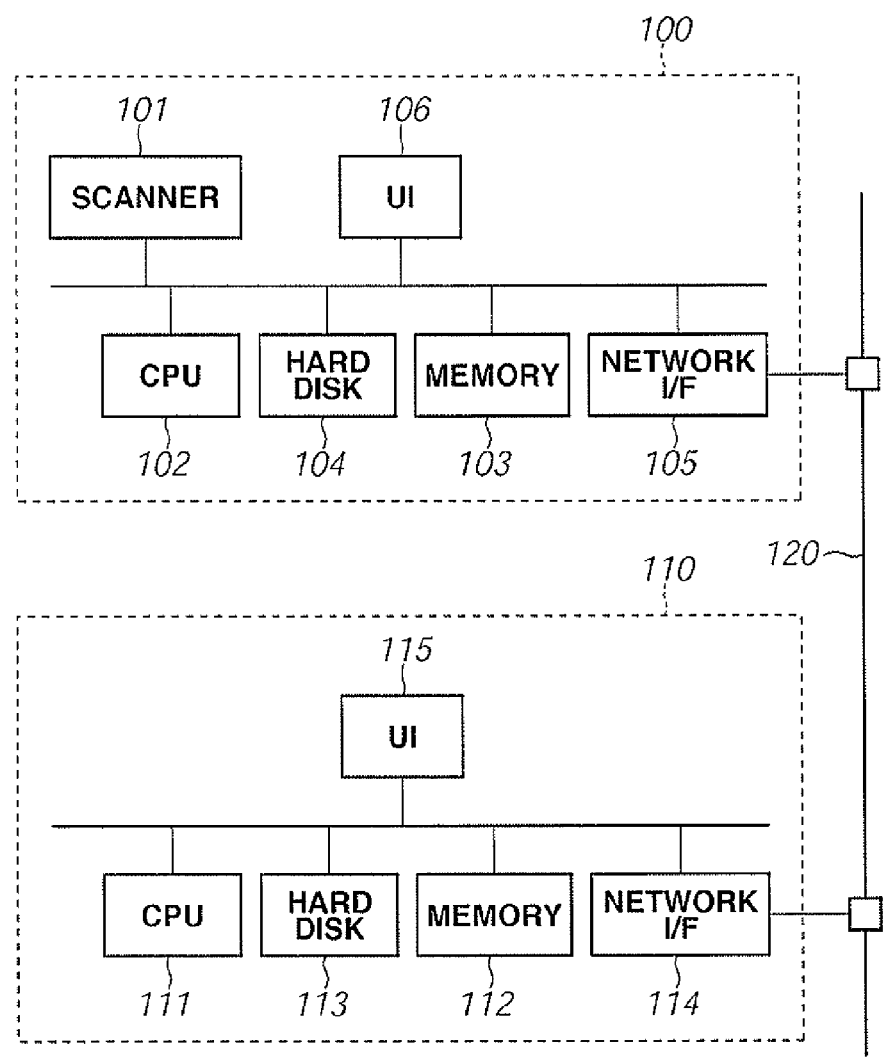
FIG. 1 is a block diagram illustrating an example of a configuration of an image processing apparatus according to a first exemplary embodiment of the present invention.

FIG. 1 is an example of a block diagram illustrating a configuration of an image processing apparatus according to a first exemplary embodiment of the present invention.

An image processing apparatus 100 converts a document image data into a searchable electronic document. The image processing apparatus 100 includes a scanner 101, a central processing unit (CPU) 102, a memory 103, a hard disk 104, a network interface (I/F) 105, and a user interface (UI) 106.

The scanner 101 reads page information on a paper document and converts the information into a document image data. The CPU 102 is a processing unit that executes a computer program which analyzes an image data and converts the result of the analysis into a searchable electronic document. The memory 103 is a storage medium which stores data of the computer program or data being processed, or is used as a work space of the CPU 102. The hard disk 104 is a large-scale storage medium for storing the computer program or data such as an electronic document. The network I/F 105 is an interface for connecting to a network 120, and is used in sending data such as a scanned image or the converted searchable electronic document to an external device, or receiving data from an external device. The UI 106 is an interface for receiving an instruction from a user, and includes an input device such as an input key or a touch panel, and a display device such as a liquid crystal display (LCD).

An image processing apparatus 110 enables searching or viewing of an electronic document generated by the image processing apparatus 100. A CPU 111 executes a computer program for searching or viewing an electronic document. A memory 112 is a storage medium used as a work space for executing the computer program or temporarily storing data. A hard disk 113 is a large-scale storage medium for storing a computer program or data such as an electronic document. A network interface (I/F) 114 receives data such as an electronic document from an external device, or sends data to an external device. A user interface (UI) 115 is an interface for receiving an instruction from a user, and includes an input device such as an input key or a touch panel, or a display device such as an LCD.

A process according to the first exemplary embodiment will be described below with reference to the flowcharts illustrated in FIGS. 2 and 3.

Figure 2:
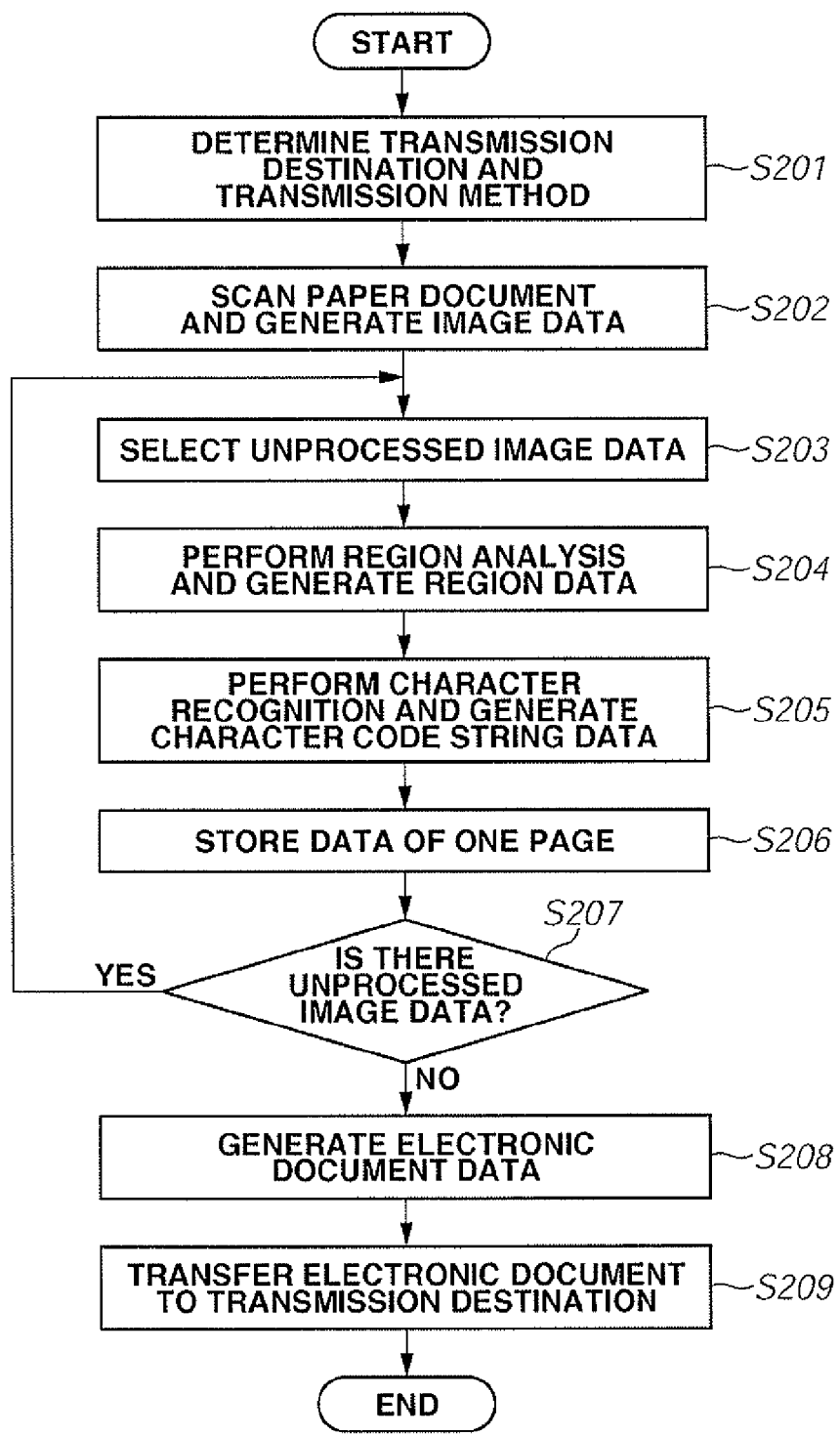
FIG. 2 is a flowchart illustrating an example of an electronic document generation process according to the first exemplary embodiment of the present invention.

FIG. 2 is a flowchart illustrating an example of a process in which the image processing apparatus 100 generates a searchable electronic document from image data acquired by scanning a paper document. The image processing apparatus 100 then sends the electronic document to the image processing apparatus 110.

In step S201, the CPU 102 determines the transmission destination and the transmission method of the electronic document to be generated, according to a user instruction operation. The user gives the instruction through the UI 106.

The user selects a transmission method from options such as electronic mail and file transfer using file transfer protocol (FTP).

The user sets a paper document on the image processing apparatus 100 and presses a start key. In step S202, the CPU 102 scans the set paper document using the scanner 101, generates a document image data, and stores the data in the memory 103. In a case where a document including a plurality of pages is input using an auto document feeder, each page is converted into a page image data and stored in the memory 103 in the order of input.

Figure 7:
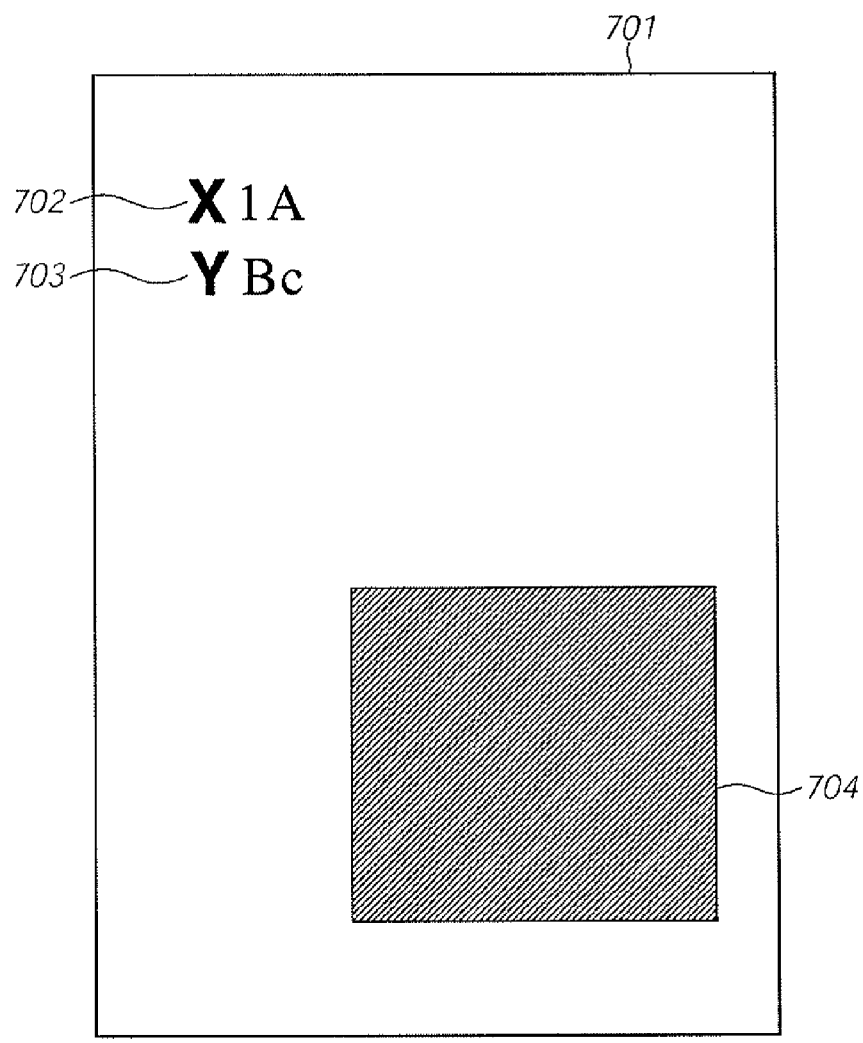
FIG. 7 illustrates an example of a page image to be processed according to the first exemplary embodiment of the present invention.

FIG. 7 illustrates an example of a page image. Referring to FIG. 7, a page image 701 includes a character string "X1A" 702, a character string "YBc" 703, and a photograph 704. The photograph 704 is indicated as a shaded rectangle for ease of description. However, the photograph 704 is actually a natural image. Further, although the example illustrated in FIG. 7 only indicates the character strings 702 and 703 and photograph 704, the page image can also include other regions such as figures.

In a case where the paper document is a color document, the page image data is in a form of a color image that represent gradation by 8 bits of RGB values. If the paper document is a monochrome document, the page image data is in a form of a gray image that represents luminance using 8 bits, or a binary image that expresses black or white using 1 bit.

In step S203, the CPU 102 selects page image data stored in the memory 103 that is not processed, as a processing target image. In a case where the image includes a plurality of pages, the CPU 102 selects one page of the image as a processing target in an order of input.

In step S204, the CPU 102 performs a region analysis by analyzing the processing target image and identifying each region of different types, such as a text region, figure region, photograph region, or table region. The CPU 102 then generates a region data of each identified region and stores the data in the memory 103. The region data includes an upper left position coordinate (x, y coordinate values) of a circumscribed rectangle of each region, a number of pixels that indicate a size (width and height) of the circumscribed rectangle, and a type of the identified region.

A conventional technique (i.e., a region identification process, a region determination process, or a region extraction process) is used in the region analysis process. For example, a technique discussed in Japanese Patent Application Laid-Open No. 06-68301 can be used so that an area where black pixels blocks of similar sizes are vertically or horizontally lined can be extracted from a binarized document image data as a text region.

Figure 8:
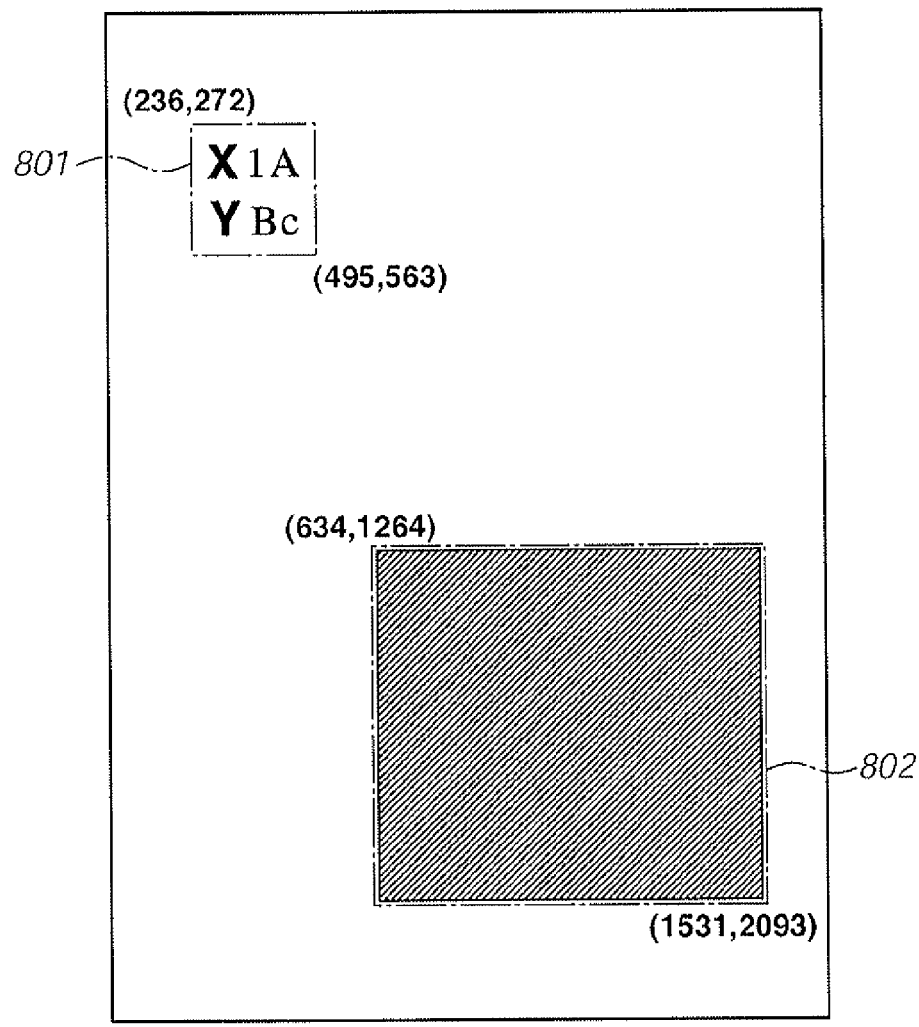
FIG. 8 illustrates an example of a result of a region segmentation process according to the first exemplary embodiment of the present invention.

A text region 801 and a photograph region 802 are identified as illustrated in FIG. 8 by performing a region analysis on the page image 701 illustrated in FIG. 7. FIG. 9 illustrates an example of region data that are acquired by performing region analysis on the page image 701 illustrated in FIG. 7.

In step S205, the CPU 102 performs character recognition on a character image in each text region identified by performing region analysis, and acquires data of a character code string for each text region. The CPU 102 then stores the data in the memory 103. The data of the character code string includes character code information which is a recognition result of each character image included in the text region. The data of the character code string further includes information on the circumscribed rectangle of each character image (i.e., information about the upper left coordinate and the width and height of the circumscribed rectangle, and information about height of a row that includes the character).

An example of a character recognition process will be described below. A conventional technique can be used in the process of recognizing the character image.

In a case where a document image is not a binary image, the text region is binarized to acquire a binary image of a text region. A histogram of each of the binarized text region is created by counting the number of black pixels in each of the vertical and horizontal lines. A strip-shaped row image is then acquired based on the vertical and horizontal histograms. In the histograms, a direction in which the histogram is periodical is designated as a row direction. A section in which the number of black pixels in the histogram is greater than or equal to a predetermined threshold value configures a character row. A histogram is then generated for each row image in a direction perpendicular to the row direction, and an image of each character is clipped based on the result of the histogram. The clipped area becomes circumscribed rectangle information of one character.

In the present exemplary embodiment, a character region is determined using a histogram obtained by counting the number of black pixels. However, a character region can be determined using projection that indicates whether there is a black pixel in each line.

A feature vector is then acquired from an image inside the circumscribed rectangle of each character image by taking out an edge component. The acquired feature vector is compared with a feature vector in a character recognition dictionary that is previously registered, to obtain a degree of similarity. A code of a character type with the highest degree of similarity is determined as the character code of the character image inside the rectangle. As a result, data to which a character code is assigned is acquired for circumscribed rectangles of all characters within the text region, and a character code group acquired from each text region becomes a character code string.

In a case of an English text character region, it is determined whether there is an interword space between characters. For example, an interword space can be determined by determining whether the distance between characters is large, or by detecting a break in words by matching a character string that is a character recognition result of the character image with a word dictionary. If it is determined that there is an interword space, the character code of the space is inserted into the character code string.

Figure 10:
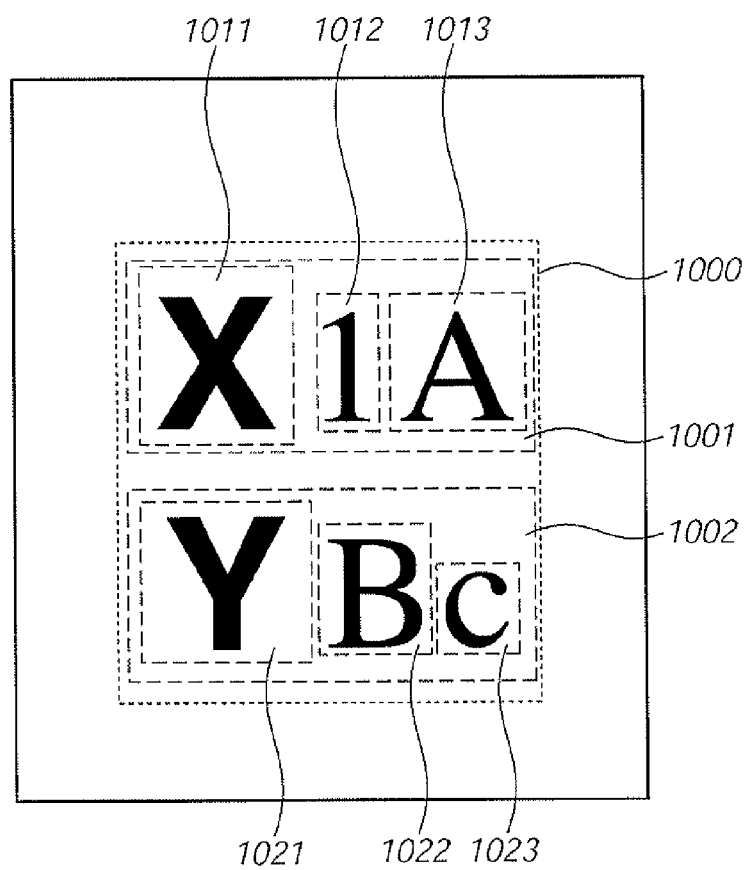
FIG. 10 illustrates an example of a character image extraction when character recognition is performed according to the first exemplary embodiment of the present invention.

FIGS. 10 and 11 illustrate examples of performing character recognition on the text region 801 illustrated in FIG. 8. First, character rows 1001 and 1002 are clipped from a text region 1000 illustrated in FIG. 10. Three characters 1011, 1012, and 1013 are then clipped from the character row 1001, and recognition is performed on each character. As a result, a character code corresponding to each character is acquired, and a character code string data 1101 as illustrated in FIG. 11 is acquired. Similarly, character recognition is performed on three characters 1021, 1022, 1023 that are clipped from the character row 1002, and a character code string data 1102 as illustrated in FIG. 11 is generated.

The above-described process is an example, and a character code row can be acquired using other conventional character recognition technology.

In step S206, the CPU 102 temporarily stores the page image data which is the present processing target, associated with the region data and the character code row data, in the memory 103 or the hard disk 104.

In step S207, the CPU 102 determines whether there is an unprocessed image data. If there is an unprocessed image data (YES in step S207), the process returns to step S203, and the CPU 102 processes the next page image data. If there is no unprocessed image data (NO in step S207), the process proceeds to step S208.

In step S208, the CPU 102 combines data of all pages stored in the memory 103 or the hard disk 104 in the page order and generates a searchable electronic document that includes a plurality of pages.

The electronic document data generated in step S208 can retain both rendering information for electronically displaying each page image on a display or printing each page image in a printer, and content information for enabling search using a search keyword. Examples of a data format that satisfies such a condition are PDF and SVG. The format of the electronic document generated in the present exemplary embodiment further designates font data to be embedded. An example of a format which requires such embedding of font data is XPS. Therefore, the present exemplary embodiment will be described below supposing that a page description format specification uses an XML expression. However, the present invention is not limited to such a format.

FIG. 6 is an example of a page description of an electronic document that is generated based on a page description format specification to be described in the present exemplary embodiment in a case where a document including page images that correspond to two pages is input. The page description format in the present exemplary embodiment collectively describes an electronic document in one file as illustrated in FIG. 6. However, the present invention is not limited to such a format. For example, a page description format can be a format (such as XPS) which separates and stores font data in a different file and refers to the font data file from the main file, and collects the files into one electronic document using ZIP compression.

An example of an electronic document data generation process performed in step S208 will be described below with reference to a flowchart illustrated in FIG. 4.

In step S401, the CPU 102 describes a start tag of the electronic document. In the page data description format specification of the present exemplary embodiment, <Document> represents a start tag of the electronic document, and an XML description between <Document> and </Document>, that represents an end of <Document>, is description data of each page included in the document. In the description example illustrated in FIG. 6, <Document> 601 is a start tag of the electronic document, and </Document> 612 is an end tag of the electronic document.

In step S402, the CPU 102 identifies data of the first page from pages that are not yet described, as the processing target.

In step S403, the CPU 102 generates and describes a tag that indicates a start of the processing target page data. In the present exemplary embodiment, <Page> represents a start of the page data, and an XML description between <Page> and </Page>, which is an end tag of the page data, is rendering data and content data of the page. Further, Width and Height attributes that each indicate a pixel width and height of the page, and a Dpi attribute which indicates a resolution are included in the <Page> tag to describe a physical size of the page. Further, a Number attribute which indicates a page number is used to describe a page number.

In the description example illustrated in FIG. 6, <Page> 602 which is a start tag of the Page element includes a description that the width of the page (i.e., Width attribute value) is "1680", the height (i.e., Height attribute value) is "2376", the resolution (i.e., Dpi attribute value) is "200", and the page number (i.e., Number attribute value) is "1". Further, the data of the first page is described between <Page> 602 and </Page> 606 which is an end tag (i.e., <Image> element 603 to <Text> element 605).

In step S404, the CPU 102 generates a tag indicating an image rendering data among data included in the page, and describes the image rendering data.

In the page data description format specification of the present explanation, one <Image> element represents a rendering data of one image. Further, content of an image data is described in a Data attribute, and a position in which the image is rendered in the page is described using coordinate information of attributes X, Y, Width, and Height. If there is a plurality of images in a page, each image data is overwritten in the order of appearance. The content of the image data is described inside the Data attribute in a compressed image data form. In the present exemplary embodiment, a color or gray image is compressed by JPEG compression, and a binary image is compressed by MMR compression, to acquire a code string used to describe content of an image data in a Data attribute.

According to a description example in an <Image> element 603 illustrated in FIG. 6, a scanned image of the first page of the document is to be rendered on the entire page. The position and the size of the image are described as X="0", Y="0", Width="1680", Height="2376" inside the <Image> element 603. Further, a character string of a code string generated by performing JPEG compression on the image is described as a Data attribute value. In FIG. 6, the character string of the Data attribute is partly abbreviated to simplify the figure. Thus, an <Image> element 603 is described. A resolution of a scanned image can be changed before storing the image after performing JPEG compression. For example, an image scanned at a resolution of 600 dpi can be changed to a resolution of 300 dpi and stored.

In step S405, the CPU 102 generates a description that indicates a rendering data of text among data included in the page.

In the page description format specification of the present explanation, one <Text> element represents a rendering data of characters in one row. Attribute data described in a <Text> element include "Direction", "X", "Y", "Font", "Size", "Color", "String", and "CGlyphId".

The "Direction" attribute described in a <Text> element indicates whether a character string is to be written vertically or horizontally. If the "Direction" attribute is not described, a default direction (e.g., horizontal, from left to right) is used. The "X", "Y" attributes designate a coordinate of a character start position.

The "Font" attribute designates a font data ID used to render a character code. The "Size" attribute designates a font size. The "Color" attribute designates a character color when a character is rendered, by a group of four values including a R component value, G component value, B component value, and an alpha channel value that represent transparency.

The "String" attribute designates contents of a character string (i.e., character code string). The "CGlyphId" attribute designates IDs of a character shape data, i.e. IDs of glyphs, used upon rendering respective characters in the "String".

The character code string included in a <Text> element data uses the character code string generated in step S205 illustrated in FIG. 2. The character code string generated in step S205 is further divided into each character row, that is, a group of characters that are lined vertically or horizontally.

In the description example illustrated in FIG. 6, two <Text> elements 604 and 605 are descriptions for rendering characters on the first page. <Text> elements 604 and 605 each correspond to the character code string data 1101 and 1102 illustrated in FIG. 11. For example, attributes as described below are designated in the <Text> element 604 which corresponds to the character code string data 1101 of the horizontally-written character string "X1A" illustrated in FIG. 11.

In the character code string data 1101, X="236" and Y="272" are designated to the X, Y attributes as an upper left coordinate of a circumscribed rectangle surrounding the three characters.

Further, "Font 01" is designated to the "Font" attribute that indicates a type of font. Further, "97" pixel is designated to the Size attribute that indicates a font size obtained by analogy from the height of a character in the character row. R component value=G component value=B component value=0, and alpha channel=255 (i.e., a transparent color) are designated to the Color attribute that indicates a character color when rendering the characters.

Further, "0x2358, 0x2332, 0x2341" are designated to the "String" attribute that indicates contents of the character string (i.e., a string of character codes that correspond to each character).

An ID of glyph used as character shape data of each character is designated to a "CglyphId" attribute described in a <Text> element. In the present exemplary embodiment, an ID of glyph is designated based on width information of each character acquired in step S205. Since a character shape of a character is to be rendered with transparent color on a scanned image, a user cannot see the character. Consequently, a character shape data (i.e., glyph) to be used is selected from a number of character shape data (e.g., eight glyph types) of simple shapes such as a rectangle, instead of using a character shape which is a shape of the character image itself. That is, control is performed to select a glyph which is appropriate for each character from a plurality of glyphs whose rectangular widths are different (or glyphs whose aspect ratios are different). Therefore, in the present exemplary embodiment, the glyph ID is selected based on the ratio between the height of the row in which the character is included and the character width.

Figure 15:
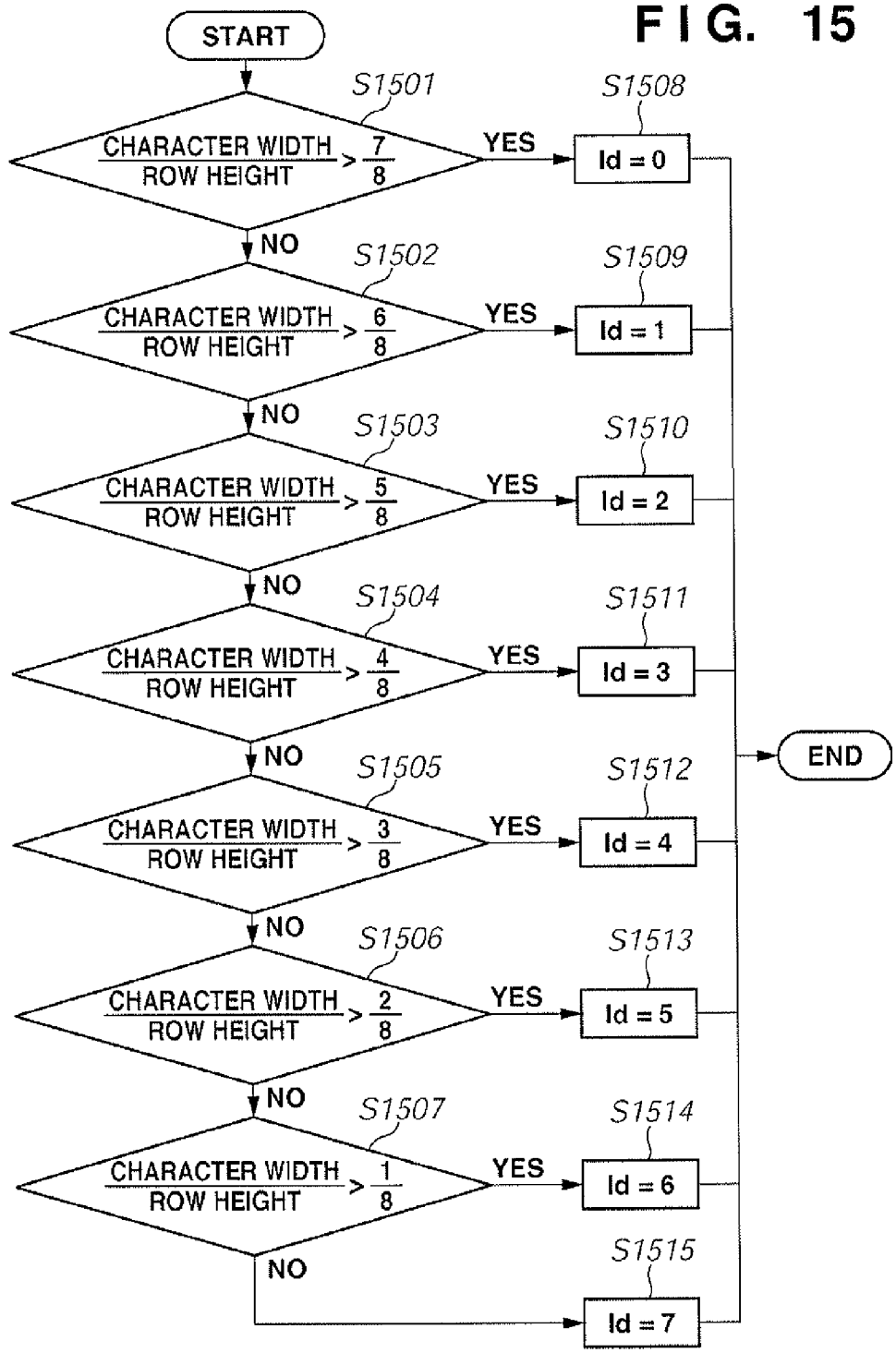
FIG. 15 is an example of a flowchart illustrating a glyph identification (ID) determination process according to the first exemplary embodiment of the present invention.
Figure 16:
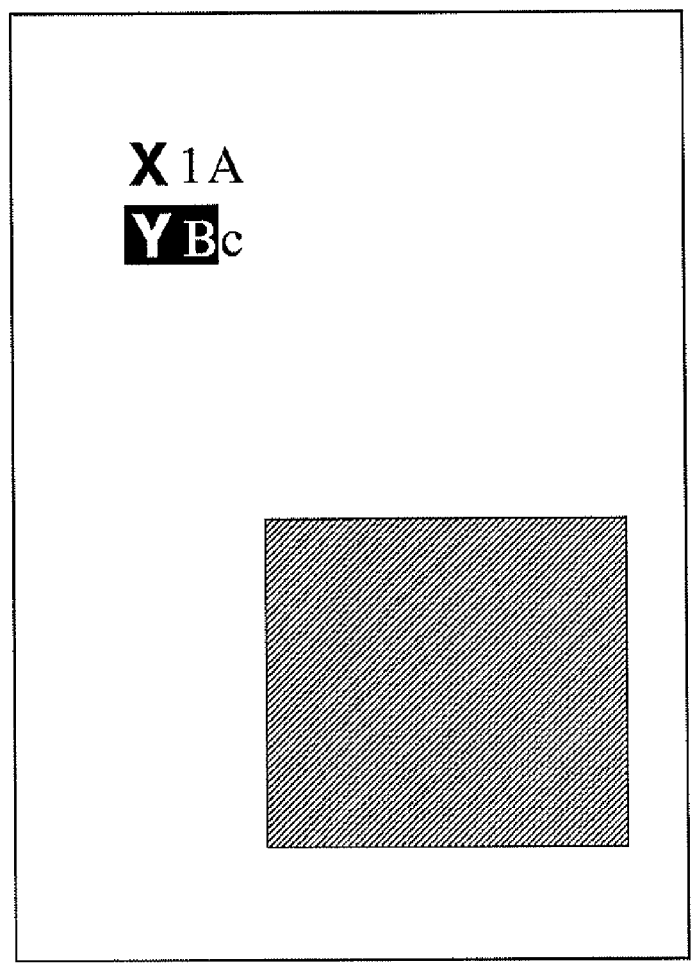
FIG. 16 illustrates an example of a page display in which a search result is highlighted according to a second exemplary embodiment of the present invention.

FIG. 15 is a flowchart illustrating an example of an operation for selecting a glyph ID for each character image performed by the image processing apparatus 100. In steps S1501 to S1507, the ratio between the character width and the row height is compared with 7/8, 6/8, 5/8/, 4/8, 3/8, 2/8, and 1/8. As a result of the comparison, the process proceeds to one of steps S1508 to S1515 to select a glyph ID from glyph IDs 0 to 7.

In a case where it is determined that the ratio (character width/row height)>7/8, the glyph ID=0 is selected. If it is determined that 7/8≧(character width/row height)>6/8, the glyph ID=1 is selected. If 6/8≧(character width/row height) >5/8, the glyph ID=2 is selected. If 5/8≧(character width/row height)>4/8, the glyph ID=3 is selected. If 4/8≧(character width/row height)>3/8, the glyph ID=4 is selected. If 3/8≧ (character width/row height)>2/8, the glyph ID=5 is selected. If 2/8≧(character width/row height)>1/8, the glyph ID=6 is selected. If (character width/row height)≦1/8, the glyph ID=7 is selected. In the present example, the rectangular width of the glyph increases as the glyph ID number decreases.

For example, in the character string 1101 illustrated in FIG. 11, (character width/row height) of each character image are "0.82", "0.14", and "0.57". Therefore, the glyph IDs are designated as "1, 6, 3" according to the selection process illustrated in FIG. 15. Similarly, as to an interword space in an English sentence, the space width is treated as a character width so that a glyph ID is selected based on the ratio of the height of the character row including the space and the space width. Glyph shapes will be described in detail below.

The above-described attribute values are an example, and the attributes can be described by other values that are similar in the definition. For example, the Size attribute which indicates a font size can be described by a value such as a number of points based on the pixel height and the image resolution instead of a number of pixels.

In step S406, the CPU 102 describes </Page> that indicates the end of the page.

In step S407, the CPU 102 determines whether there is a page that is not described. In a case where there is a page that is not described (YES in step S407), the process returns to step S403 so that the next page becomes a page image to be processed. On the other hand, if there is no page that is not described (NO in step S407), the process proceeds to step S408.

In the present exemplary embodiment, the CPU 102 performs the processes of steps S404 to S406 on the image that correspond to the second page, and describes elements between Page element 607 and </Page> 610 as in the description example illustrated in FIG. 6.

In step S408, the CPU 102 describes contents of font data including all glyphs used in rendering character strings in the electronic document.

In the page data description format specification of the present exemplary embodiment, the glyph data included in the font data is described between <Font> and </Font> as a Glyph element. The <Font> element includes an ID attribute that indicates a type of font. The Glyph element includes an ID attribute that indicates a type of glyph and a Path attribute that indicates a glyph (character shape) that corresponds to the ID. The Path attribute is described to express a glyph using a linear or a curved line within a rendering rectangle whose origin is at a lower Left position.

In the description example illustrated in FIG. 6, a font of Id="Font01" is defined in a <Font> element 611, in which 8 types of glyph whose glyph ID="0" to "7" are defined. For example, a Path attribute "M0, 0 V-1024 H128 V1024 f" that represents a shape of glyph whose ID="7" describes a glyph defined as follows: "MOVE to origin (0, 0), render 1024 units vertical line upward, render 128 units horizontal line in right direction, render 1024 units vertical line downward, render line from present point to starting point and mark out enclosed area". That is, the Path attribute is a description that expresses a rectangle glyph in which a 1024*128 rectangle is marked out. The other IDs are oblong glyphs in which the glyph whose ID="7" is integrally multiplied stepwise in a horizontal direction. For example, ID="0" is a description that expresses a square glyph in which 1024*1024 is marked out.

The description in the <Font> element 611 illustrated in FIG. 6 is an example, and a simple character shape such as a triangle, circle, or a linear line can be defined, or a blank (i.e., a space) can be defined as a glyph (character shape).

In step S409, the CPU 102 describes </Document> that indicates end of the electronic document, and ends generation of the electronic document. The generated electronic document is stored as a file in the memory 103 or the hard disk 104 in the image processing apparatus 100. The electronic document can be compressed using a conventional text compression technology when storing the electronic document.

Returning to FIG. 2, in step S209, the CPU 102 transmits the electronic document that is generated in step S208 to the transmission destination (e.g., the image processing apparatus 110) designated in step S201 using a designated transmission method. Since the data transmission process uses a conventional technology, description will be omitted.

The image processing apparatus 110 which is the transmission destination receives the electronic document transferred through the network I/F 114, and stores the electronic document in the hard disk 113. Since the data receiving process uses a conventional technology, description will be omitted.

Identification information (such as a file name) for identifying in a hard disk an electronic document stored inside an apparatus can be any information. For example, a character string which is related to time at which the electronic document is received can be assigned as identification information. Further, a unique number can be selected and automatically assigned or designated by a user when an electronic document is generated.

An example of a process of searching and viewing an electronic document will be described below with reference to a flowchart illustrated in FIG. 3. In the present exemplary embodiment, the image processing apparatus 110 performs the search. However, the present invention is not limited to the present embodiment, and the image processing apparatus 100 can also perform the search.

In step S301, a user inputs a search keyword that is assumed to be included in a text of an electronic document that the user desires to search. The user inputs the keyword from the UI 115 to search a character string in the electronic document from electronic documents that are stored in the image processing apparatus 110. In the present exemplary embodiment, the length of the input character string is indicated as k.

In step S302, the CPU 111 determines whether there is an unsearched electronic document file among all electronic files stored in the hard disk 113 of the image processing apparatus 110. In a case where there are unsearched electronic document files (YES in step S302), the CPU 111 identifies one of the unsearched electronic files. If the identified electronic file is compressed, the CPU 111 expands the file. The process proceeds to step S303. On the other hand, if there is no unsearched electronic document (NO in step S302), the process proceeds to step S312. In step S312, the CPU 111 notifies the user that search of all electronic documents has ended.

In step S303, the CPU 111 prepares to search text data in the electronic document that is identified in step S302. The CPU 111 aligns the text (character code) inside the document into one line and initializes a search start position n, that is, sets n=0.

An example of a process performed in step S303 will be described below.

The electronic document data is parsed by an XML parser, and if there is a <Text> element, a character code string described in a String attribute is acquired. A pair of the character code and a position where the character code value is described in the electronic document data is then added to a character code sequence table for each character, according to the character code string that is described in the String attribute. The description position of the character code value is the position of the head of a character code string in which the character code is described in the electronic document data, indicated by the number of characters counting from the head of the electronic data. An example of a character code sequence table that is generated from the electronic document in FIG. 6 is illustrated in FIG. 12.

For example, three character codes "0x2358", "0x2332", and "0x2341" are described in the String attribute in the <Text> element 604 of the electronic document illustrated in FIG. 6. Each character code is described from positions that are 1093 characters, 1100 characters, and 1107 characters from the head of the electronic document respectively. Similarly, description positions of the remaining six character codes are obtained based on the <Text> elements 605 and 609, so that a character code sequence table as illustrated in FIG. 12 is generated. In the table illustrated in FIG. 12, a character string number is assigned in order from 0.

In step S304, the CPU 111 determines whether the character code sequence table matches the character code string of the search keyword by setting the search start position n as the origin. When a matching portion is detected (YES in step S304), the variable n of the matching portion is set as a head position of the matching character string, and the process proceeds to step S305. On the other hand, if there is no matching portion (NO in step S304), the process proceeds to step S309.

In step S309, the CPU 111 determines whether all characters in the character code sequence table have been searched. When the CPU 111 determines that all character code strings stored in the character code sequence table have been searched (YES in step S309), the process proceeds to step S311. In step S311, the CPU 111 notifies the user that the search of the electronic document which is the present search target has ended. On the other hand, if all searches have not been completed (NO in step S309), the process proceeds to step S310.

In step S310, the CPU 111 increments the variable n by 1 and returns to step S304. In step S304, the CPU 111 determines whether the character code sequence table matches the character code string of the search keyword at the next search start position n. When the total number of character codes stored in the character code sequence table is N, it can be determined that all search is not completed if $n<(N-k)$. It is determined that search is completed if $n \geqq (N-k)$, in step S309.

For example, in a case where the character code sequence table illustrated in FIG. 12 is searched by a search keyword "YB", the character code string "0x2359", "0x2342" of the search keyword "YB" is scanned from the head of the character code sequence table to search for a matching portion. In such a case, the processes of steps S304, S309, and S310 are repeated, and n=3 is extracted as the character string number of the first matching character string.

In step S305, the CPU 111 identifies the page in the electronic document to which the character string data that corresponds to the character string number n belongs to.

For example, a page number can be identified by a Number attribute if the Page element which describes the <Text> element is identified when the electronic document is parsed. Therefore, the page that the character string belongs to can be identified by acquiring a description position of a character string that corresponds to the position n identified in step S305 from the table illustrated in FIG. 12. The Page element in which the description position is included can then be determined. The page number can be easily identified based on a character string number, if the Page element in which each <Text> element is described is identified when parsing the electronic document data in step S303, and the position is stored in the character code sequence table illustrated in FIG. 12. The present invention is not limited to the above-described examples. Detecting matching character strings in step S304 or identifying a page number in step S305 can be performed in other ways.

In step S306, the CPU 111 renders the page according to the page rendering description determined in step S305 and displays the result on the UI 115. At this point, if a character included between character string numbers n and n+k−1 is to be rendered, the CPU 111 renders the character by adding a highlighting effect so that a user can easily identify where the character is located. Addition of a highlighting effect to a portion that matches a search keyword will be described in detail below.

The page rendering process performed in step S306 will be described with reference to a flowchart illustrated in FIG. 5.

In step S501, the CPU 111 determines a size of a page image to be obtained as a rendering result, from values of Width and Height attributes included in a Page element that corresponds to the identified page number.

In step S502, the CPU 111 allocates a memory that can store pixel information about the page image.

In step S503, the CPU 111 extracts an unprocessed element from subelements of the Page element and determines the type of the unprocessed element. If the unprocessed element is an <Image> element (<Image> in step S503), the process proceeds to step S504, and if the unprocessed element is a <Text> element (<Text> in step S503), the process proceeds to step S505. In a case where all subelements in the Page element have been processed (NONE in step S503), the process proceeds to step S517.

In step S504, the CPU 111 rasterizes a compressed image that is described as a Data attribute value in the <Image> element. Further, the CPU 111 scales the rasterized image, so that the image fully fits into a rendering rectangle region in the page image defined by each of X, Y, Width, and Height attributes. The CPU 111 then overwrites the image onto the region in the page image memory allocated in step S502, and the process returns to step S503.

In step S505, the CPU 111 acquires a character start position (X, Y), a character font ID (F), a character size (S), and a character color (C), from each of the attributes described in the <Text> element which is a processing target. Further, the CPU 111 acquires the number of characters (N) described in the <Text> element.

In step S506, the CPU 111 allocates a memory for generating a glyph image. In the present exemplary embodiment, the CPU 111 allocates a memory for storing a binary image of 1024*1024 pixels.

In step S507, the CPU 111 initializes a counter i which indicates a character being processed to 1.

In step S508, the CPU 111 determines whether i>N, and if i≦N (NO in step S508), the process proceeds to step S509. On the other hand, if i>N (YES in step S508), the CPU 111 determines that the processing of the <Text> element is completed and returns to step S503.

In step S509, the CPU 111 acquires a character code (P) of the ith character from the String attribute and GlyphId (Q) of the ith character from the CGlyphId attribute in the <Text> element.

In step S510, the CPU 111 locates a <Font> element description whose font Id is (F) in the electronic document. Further, the CPU 111 acquires a Path attribute from a Glyph element whose glyph Id is (Q) from subelements in the <Font> element description.

In step S511, the CPU 111 generates a glyph binary image in the glyph image generation memory allocated in step S506, according to the Path attribute value acquired in step S510. A glyph binary image is an image in which a portion that is to be rendered is represented by 1, and a portion that is not to be rendered is represented by 0. In the present exemplary embodiment, the portion 1 which is to be rendered is later rendered by a transparent color.

In step S512, the CPU 111 scales the size of the glyph binary image to a size of a rectangle according to the value of the character size attribute (S). The width of portion 1 in which the scaled glyph binary image is to be rendered is acquired as a scaled glyph width Wi.

In step S513, the CPU 111 renders a binary image of a glyph which is scaled in step S512, on a rectangular region based on a coordinate position (X, Y) in the page image memory. Pixel values of each pixel when the binary image is rendered on a page image are defined as described below. In the definition, each pixel value in a page image before rendering a glyph is (r, g, b), whereas a pixel value after rendering the glyph is (r', g', b').

Pixel whose pixel value in a glyph binary image is 0: (r', g', b')=(r, g, b)

Pixel whose pixel value in a glyph binary image is 1: (r', g', b')=(F(r, Cr), F(g, Cg), F(b, Cb)

In the above-described definitions, F(r, Cr)=(r*A+Cr*(255−A))/255, F(g, Cg)=(g*A+Cg*(255−A))/255, F(b, Cb)=(b*A+Cb*(255−A))/255.

Further, A is an alpha channel value of character color C, and Cr, Cg, and Cb are each of the R, G, and B values of the character color C. In a case where 255 is designated as the alpha channel value, the glyph binary image is transparent. Therefore, (r', g', b')=(r, g, b) for a pixel when a pixel value of a glyph binary image is 1.

In step S514, the CPU 111 determines whether the ith character which is being processed is a character included between n and n+k−1, using, for example, the character code sequence table illustrated in FIG. 12. To be more specific, since the CPU 111 can recognize a description start position for each character between n and n+k−1 from the sequence table, the CPU 111 determines based on whether the start position of the character i being processed matches one of the positions. If the ith character is a character included between n and n+k−1, (YES in step S514), the process proceeds to S515. On the other hand, if the ith character is not between n and n+k−1 (NO in step S514), the process proceeds to step S516.

In step S515, the CPU 111 performs a highlighting process to indicate that the character being processed is within the portion which is detected as a search character string. To be more precise, each pixel value (r, g, b) is changed to the pixel value (r', g', b') as described below, for each pixel within the rectangular region corresponding to the area in which the character string is rendered, starting from position (X, Y) in the page image memory.

(r', g', b')=(G(r), G(g), G(b))

(wherein G(r)=255−r, G(g)=255−g, G(b)=255−b)

The above-described highlighting process which reverses color is an example, and other highlighting processes can be performed. For example, a process can be performed in which a pixel whose pixel value in the glyph binary image is 0 is not changed, and each pixel value (r, g, b) of a pixel whose pixel value in the glyph binary image is 1 is changed to (r', g', b') as described above.

In step S516, the CPU 111 determines the rendering start position X for the next character, increments i by 1 (i.e., i=I+1), and returns to step S508. The rendering start position X of the next character is calculated by adding a scaled glyph width Wi and distance between characters to the rendering start position of the present character. In the present exemplary embodiment, data such as character spacing and distance between characters are not stored to reduce the amount of data. The rendering start position X is thus calculated by supposing that the distance between characters is 10% of the scaled glyph width Wi. Therefore, the rendering start position X of the next character is calculated by X=X+1.1*Wi. The distance between characters do not have to be calculated as described above, and the distance between characters can be 10% of the character size or a predetermined constant number.

In step S517, the CPU 111 transfers the rendering result that corresponds to one page, that is, contents of a page image memory in which the descriptions of the <Image> and <Text> elements in the Page element are rendered, to the display buffer in the UI 115. The CPU 111 then displays the result.

Figure 5:
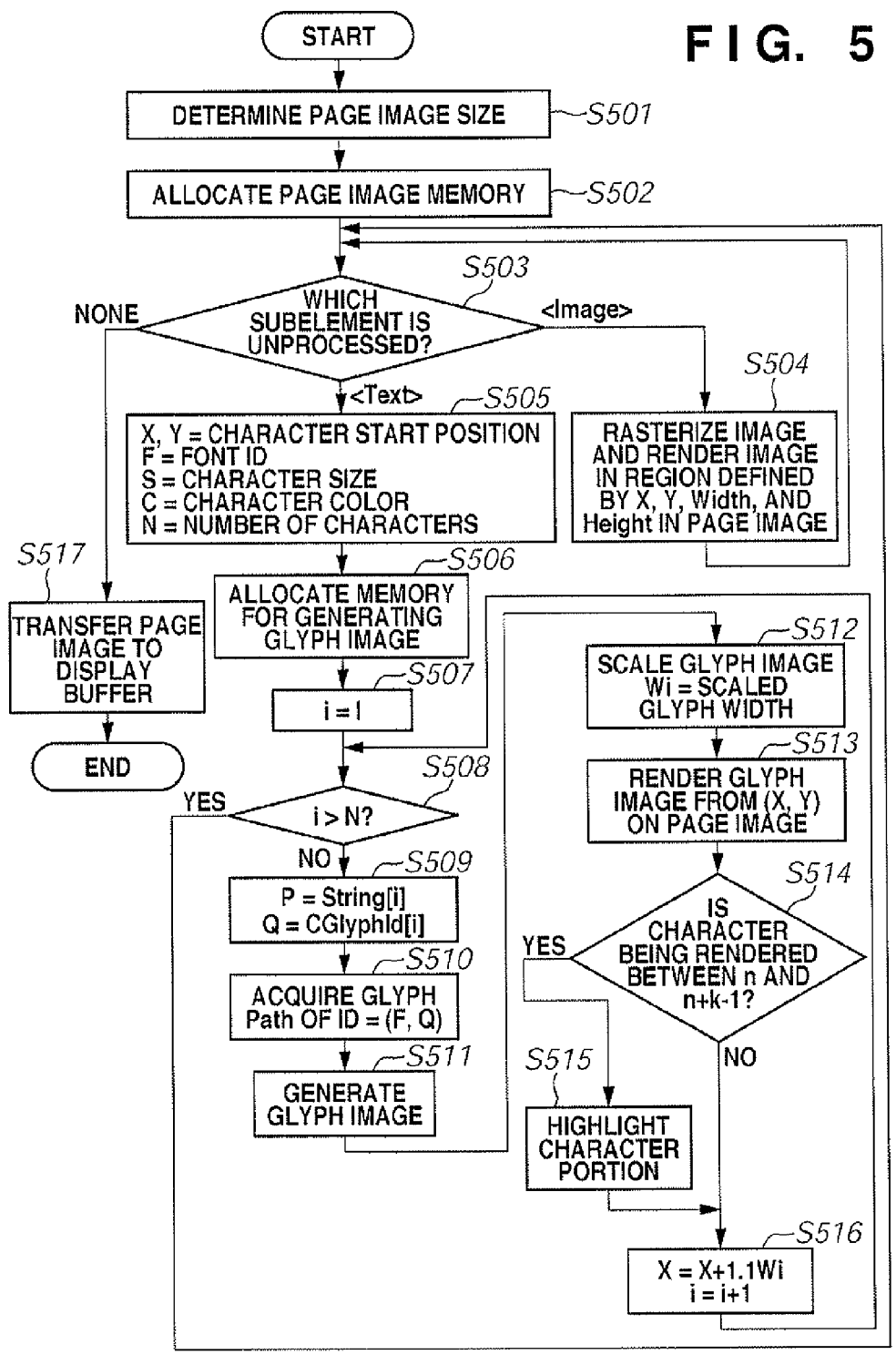
FIG. 5 is a flowchart illustrating in detail a page rendering process performed in step S306 of a flowchart illustrated in FIG. 3 according to the first exemplary embodiment of the present invention.

The process of the flowchart illustrated in FIG. 5 is performed as an example on the rendering description of the first page in the electronic document illustrated in FIG. 6 as described below.

Upon performing the process of step S501, the CPU 111 determines the image size of the page as 1680*2376 pixels based on the attribute values of Width="1680" and Height="2376" described in the Page element 602 of the first page illustrated in FIG. 6.

In step S502, the CPU 111 allocates a memory of 1680*2376*3 bytes in a case where the page image is expressed as an R, G, B 24-bit color image.

In step S504, the compressed code described as the Data attribute value of the <Image> element 603 illustrated in FIG. 6 is rasterized into an image, and the image is overwritten on the entire region of the page image memory. In the present exemplary embodiment, since the pixel size of the image data is 1680*2376 pixels which is the same size as the original page, a scaling process is not performed.

In step S505, the CPU 111 acquires X="236", Y="272", number of characters N="3", character font ID="Font01", character size="97", and character color="0, 0, 0, 255" from each of the attributes included in the <Text> element 604.

In step S509, the CPU 111 acquires the first character code of the String attribute=0x2358 and the Glyph ID="1" from the <Text> element 604.

In step S510, the CPU 111 then acquires a glyph Path data corresponding to the acquired character font ID="Font01" for generating a glyph binary image in step S511. In the present exemplary embodiment, the CPU 111 acquires a Path attribute of Id="1" in the Glyph element within the <Font> element 611 in the description example illustrated in FIG. 6.

In step S511, the CPU 111 then generates a glyph image based on the acquired Path attribute data corresponding to Id="1" in the Glyph element. To be more specific, the entire rectangular region of 1024*896 pixels is marked out by 1 according to the description of the Path attribute. The glyph image is thus generated by marking out a rectangle which is 1024 pixels in the vertical direction and 896 pixels in the horizontal direction from the left end of a region of 1024*1024 pixels allocated as a memory for generating a glyph image.

In step S512, the CPU 111 scales the glyph image generation memory of 1024*1024 pixels to 97*97 pixels based on the character size "97". Therefore, the region to be marked out becomes 97*85 pixels (i.e., scaled glyph width Wi=85).

In step S513, the character image of the scaled glyph is rendered in a rectangular region of 97*97 starting from the position (X, Y)=(236, 272) on the page image. In the description example illustrated in FIG. 6, since the character color=0, 0, 0, 255, that is, the alpha channel value A is 255, (r', g', b')=(r, g, b) for all cases even if the pixel value that corresponds to the glyph binary image is 1. That is, the pixel value within the rectangular region in the page image does not change before and after performing the process of step S513.

In step S514, the CPU 111 determines whether the first character in the <Text> element 604 illustrated in FIG. 6 is included between character string numbers n and n+k−1, based on the character code sequence table.

In the present exemplary embodiment, it is supposed that the character code sequence table illustrated in FIG. 12 is generated from the electronic document illustrated in FIG. 6.

Further, it is supposed that a character string determined to match a search keyword in step S304 is between character string numbers 3 and 4. Since the first character code of the <Text> element 604 illustrated in FIG. 6 is not between character string numbers 3 and 4, the process proceeds to step S516. A head character position of the first character code description in the <Text> element 604 is 1093, which does not match the character description positions between character string numbers 3 and 4 in the character code sequence table. Therefore, it can be determined that the first character in the <Text> element 604 is not a character between character string numbers 3 to 4.

On the other hand, in a case where the CPU 111 determines whether the first character in the <Text> element 605 illustrated in FIG. 6 is included between character string numbers n and n+k−1 in step S514, the CPU 111 determines that the first character code matches the start position of a character between character string numbers 3 and 4 in the character code sequence table. The highlighting process in step S515 is thus performed.

Since the glyph ID corresponding to the first character in the <Text> element 605 is "0", the region of 92*92 pixels starting from a position (236, 472) in the page image memory is marked out by a transparent color. Therefore, in step S515, each pixel value (r, g, b) in the region of 92*92 pixels starting from a position (236, 472) in the page image memory is changed to (G(r), G(g), G(b)).

For example, in a case where the first character code in the <Text> element 604 is rendered (the rendering start position being (236, 272)), the CPU 111 calculates a rendering start position X of the next character in step S516 as 236+1.1*85=330. Therefore, the rendering start position of the second character code in the <Text> element 604 becomes (330, 272).

Figure 13:
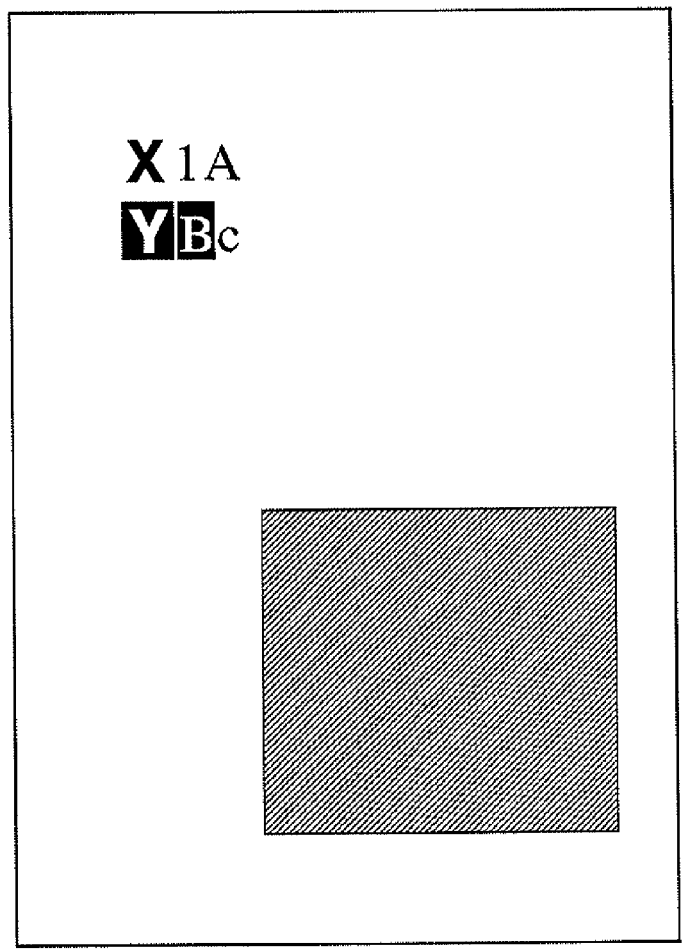
FIG. 13 illustrates an example of a page display in which a search result is highlighted according to the first exemplary embodiment of the present invention.

As a result, when descriptions in all <Text> elements are rendered, a page image illustrated in FIG. 13 is acquired. The luminance is reversed in regions that correspond to characters in a character string which has been determined to match the search keyword in step S304. Regions that correspond to the rest of the characters remain the same as the image data rendered by the <Image> element.

As described above, according to the present exemplary embodiment, since the searched character string is highlighted and displayed, a user can easily determine where a search keyword exists in a page by viewing a page image displayed in step S306. Further, since a glyph that matches the character width is rendered by a transparent color, the position of the highlighted character more closely matches the character image in the document image during the search. Therefore, it becomes easier for a user to identify the search keyword.

FIGS. 14A and 14B illustrate examples of how a page image is displayed when setting a different highlighting method.

In the page rendering description illustrated in FIG. 14A, eight types of glyph that render marked-out rectangles of height 128 and widths 1024 to 128 in the lower part of a character of height 1024 are defined as glyphs of font data. When an attribute data in a <Text> element is described in step S405 illustrated in FIG. 4, a rectangular transparent character of a low height that corresponds to each glyph is rendered in the lower part of the corresponding character image. In such a page rendering description, if the rectangular region of each glyph is reverse-highlighted in the highlighting process of step S515, a page image which is highlighted as illustrated in FIG. 14B is generated. As a result, a user can see that the searched portion is underlined and highlighted, and the user can easily determine where the searched character string exists in the page.

Returning to FIG. 3, in step S307, the CPU 111 allows a user to select whether to end the searching and viewing process, or continue search in a different search area. If the user selects to end the process (END in step S307), the process illustrated in FIG. 3 ends, and if the user selects to continue search (CONTINUE in step S307), the process proceeds to step S308.

In step S308, the CPU 111 defines n as n=n+k, returns to step S304, and searches for a next portion that matches the search keyword.

As described above, according to the first exemplary embodiment of the present invention, when a paper document is converted to an electronic document, it is described in the electronic document that characters extracted from a page is to be rendered in a transparent color on a page image. A user can thus search the electronic document by confirming a page display in which a portion matching the keyword is highlighted.

The above-described electronic document stores font data including a number of simple glyphs (character shapes such as a rectangle) of different character widths. The electronic document describes that a simple glyph (character shape) that matches the width of each character type is to be selected and rendered when transparent characters of various character types in the document are to be rendered. That is, a number of glyphs (character shapes), such as eight types of glyphs (character shapes) with different widths, are shared and used relative to a plurality of character types (e.g., hundreds of character types).

Further, the rendering position of the transparent text approximately matches the position of each character image in the document image even in a case where a rendering position of the transparent text is not minutely described (e.g., by using a position coordinate of a character) for each character. Therefore, the file size (i.e., the data amount) of the electronic document can be reduced even when it is necessary to store font data used in an electronic document in the electronic document.

Second Exemplary Embodiment

Figure 4:
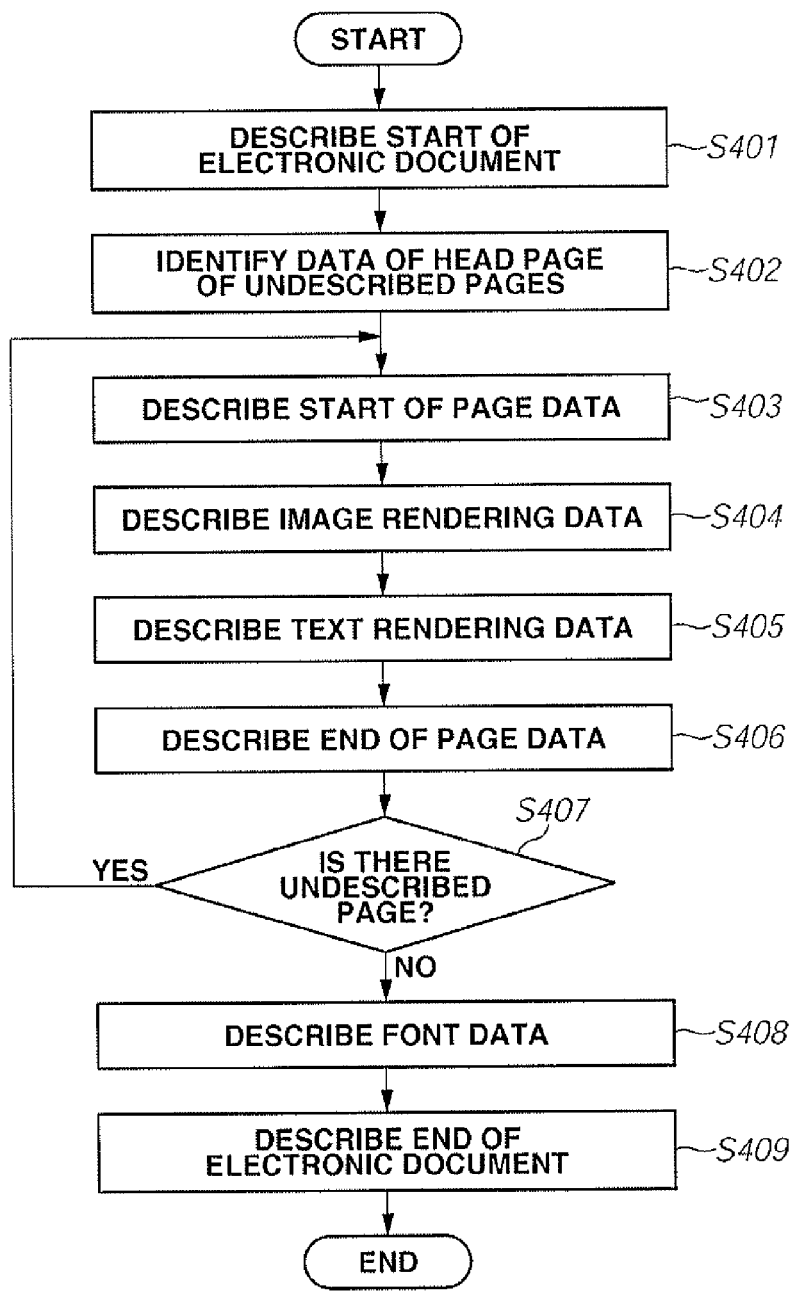
FIG. 4 is a flowchart illustrating in detail an electronic document data generation process performed in step S208 of a flowchart illustrated in FIG. 2 according to the first exemplary embodiment of the present invention.

In the first exemplary embodiment, when an attribute data of a glyph ID in the text element is described in step S405 illustrated in FIG. 4, a glyph which corresponds to each character is determined based on the width and height information of each character. However, the present invention is not limited to that embodiment.

For example, a glyph ID can be selected by obtaining the distance (character spacing) between the left end of the subject character and the left end of the next character using position information of each character image acquired by performing character recognition in step S205 and based on a ratio of the distance and the character row height. In a case where the subject character is a last character in a character row, the character width of the character is used as the distance. In such a case, since the distance may be greater than the character row height, a rectangular glyph whose width is greater than the height (such as width 1152 or 1280) can be used. Further, in such a case, a rendering start position X of the next character is obtained as X=X+Wi in step S516 illustrated in FIG. 5.

Therefore, when a search process is performed on an electronic document generated by selecting a glyph ID based on the character spacing as described above, the space between characters in the character string that matches the keyword is also highlighted.

As described above, according to the second exemplary embodiment, a rendering position of the transparent text approximately matches the position of each character image in a document image even in a case where the rendering position of the transparent text (such as the position coordinate of a character) is not described for all characters. Further, since the total number of glyphs to be stored is a limited number (e.g., ten glyphs), the data amount of font data can be reduced. Further, since the shape of the glyph is simplified, the data amount of the glyph data (character shape data) itself can be reduced.

Third Exemplary Embodiment

A third exemplary embodiment of the present invention describes a process of determining a rendering start position X of a next character which is different from step S516 illustrated in FIG. 5 in the above-described exemplary embodiment.

In the present exemplary embodiment, the CPU 111 calculates an average value of a distance between characters based on position information of each character image that is identified by performing character recognition in step S205 of the flowchart illustrated in FIG. 2 in the above-described exemplary embodiment. When a <Text> element is then described in step S405 illustrated in FIG. 4, the average value of distance between characters in the character region is described as an attribute data (AvC). In step S516, the CPU 111 can determine a rendering start position of the next character by using the described average value of distance between characters (AvC). In such a case, a rendering start position of the next character becomes X=X+Wi+AvC.

Fourth Exemplary Embodiment

In the above-described exemplary embodiment, an electronic document which describes a full image obtained by compressing a scanned image by JPEG compression in an <Image> element, and a transparent text in a <Text> element, is generated. However, the present invention is not limited to the above-described embodiment.

For example, instead of describing an entire scanned image which is compressed by JPEG compression, a text region and a figure region can be converted into binary images for each color and compressed by MMR compression, and other regions can be compressed by JPEG compression. Such descriptions can be stored in an <Image> element. Japanese Patent Application Laid-Open No. 07-236062 and 2002-077633 discuss such a method in which regions included in a document image is analyzed and appropriately compressed. A further high-compressed electronic document can be generated by combining a process of reducing the amount of font data used in rendering a transparent text and the above-described image compression process.

Further, only a region such as a character region, figure region, table region, or photograph region may be stored together with position data instead of the whole image.

Fifth Exemplary Embodiment

In the above-described exemplary embodiment, when a portion corresponding to a searched result is highlighted, the color of the image (r, g, b) is reversed. However, the colors that can be used are not limited to the above colors. For example, a predetermined color (such as yellow) for specifying a search result can be rendered translucent (such as alpha channel 128). Further, a character color (Cr, Cg, Cb) can be used to determine a highlight color.

Sixth Exemplary Embodiment

Figure 3:
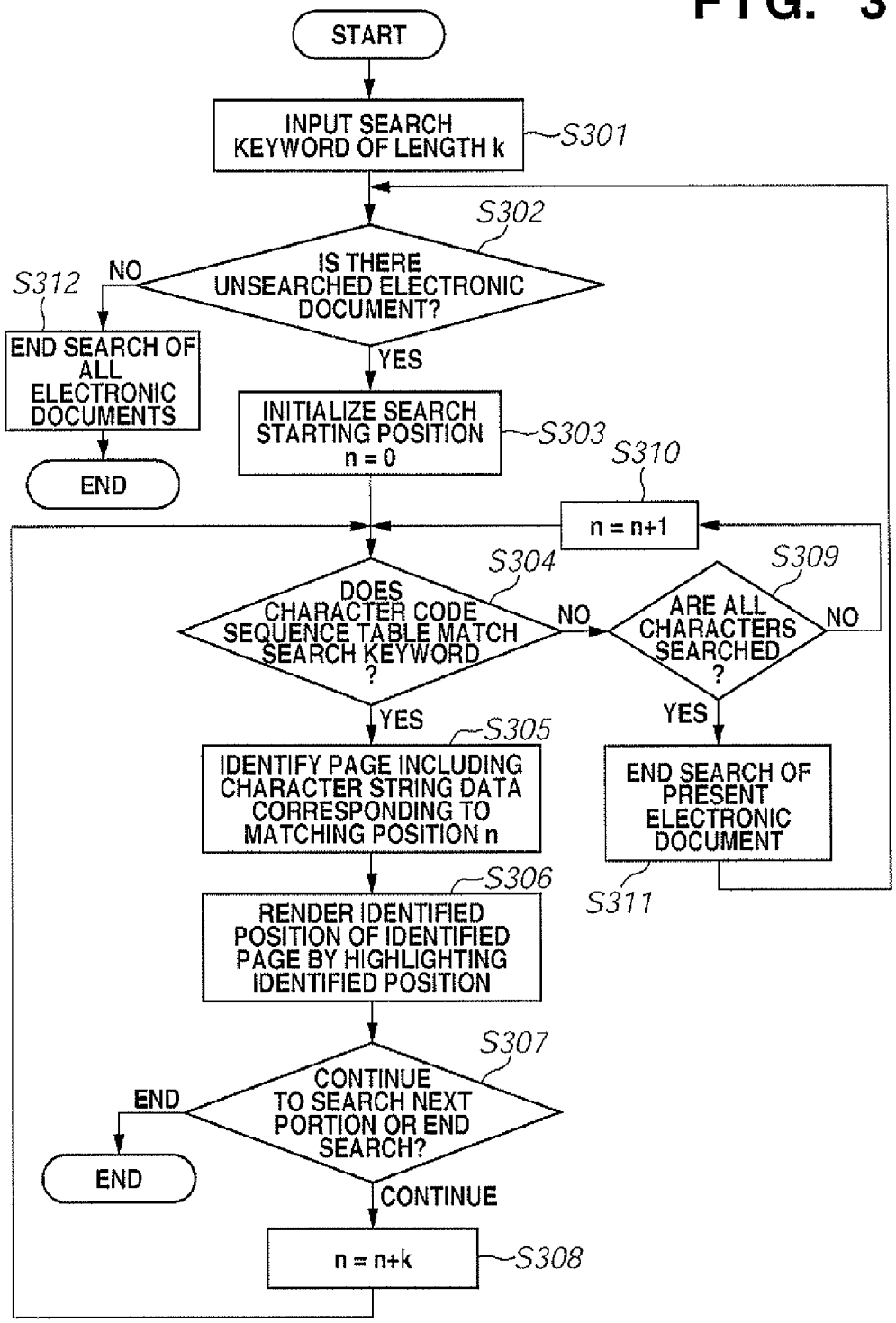
FIG. 3 is a flowchart illustrating an example of an electronic document search and viewing process according to the first exemplary embodiment of the present invention.

In flowcharts illustrated in FIGS. 3 and 5 of the above-described exemplary embodiment, a character string that matches a keyword is searched in sequence from the head of a document, and the character string that is first searched is highlighted. If there is an instruction to "search next string", the next character string that matches the keyword is sequentially searched and highlighted. However, the present invention is not limited to searching of a character string that matches a search keyword in order from the head of the document and highlighting a character string hit with the search keyword. For example, all character strings included in an electronic document can be compared with a search keyword, and all matching character strings can be specified and simultaneously highlighted.

Other Exemplary Embodiments

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor, memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-172737, filed Jun. 29, 2007, which is hereby incorporated by reference herein in its entirety.

The invention claimed is:

1. An image processing apparatus comprising:
  a character recognition unit configured to perform character recognition on a plurality of character images in a document image to acquire a character code corresponding to each character image;
  a selection unit configured to select a glyph to be used for each character image from a plurality of glyphs, based on both of a character width and character row height of each character image in the document image; and
  a generation unit configured to generate an electronic document, wherein the electronic document includes the document image, a plurality of character codes acquired by the character recognition unit, the plurality of glyphs, and description data which indicates the glyphs to be used for the character codes,
  wherein each of the plurality of glyphs is shared and used by different character codes based on the description data when rendering characters that correspond to the plurality of character codes acquired by the character recognition unit, and
  wherein the description data is described based on the glyph selected by the selection unit for each character image in the document image.

2. The image processing apparatus according to claim 1, wherein each of the glyphs has a different width.

3. The image processing apparatus according to claim 1, wherein each of the glyphs indicates a simple shape.

4. The image processing apparatus according to claim 1, wherein each of the glyphs indicates a rectangular shape.

5. The image processing apparatus according to claim 1, wherein each of the glyphs indicates shape of blank character.

6. The image processing apparatus according to claim 1, wherein the generation unit generates the electronic document that includes an average value of a distance between characters.

7. The image processing apparatus according to claim 1, wherein the electronic document generated by the generation unit includes a description for rendering the glyphs that correspond to the plurality of character codes in a transparent color at a position that matches each character image in the document image.

8. The image processing apparatus according to claim 1, wherein the electronic document is generated in an XML format.

9. The image processing apparatus according to claim 1, wherein the electronic document is generated in an XPS format.

10. The image processing apparatus according to claim 1, further comprising a compression unit configured to compress the document image for storage in the electronic document.

11. The image processing apparatus according to claim 10, wherein the compression unit analyzes a region included in the document image and adaptively performs compression.

12. The image processing apparatus according to claim 1, further comprising a search unit configured to search the generated electronic document using an input keyword and to highlight a portion that matches the keyword.

13. The image processing apparatus according to claim 12, wherein the search unit highlights a portion matching the keyword by reversing a color of the matching portion.

14. An image processing apparatus comprising:
a character recognition unit configured to perform character recognition on a plurality of character images in a document image to acquire a character code corresponding to each character image;
a selection unit configured to select a glyph to be used for each character image from a plurality of glyphs, based on a character spacing of each character image in the document image; and
a generation unit configured to generate an electronic document, wherein the electronic document includes the document image, a plurality of character codes acquired by the character recognition unit, the plurality of glyphs, and description data which indicates the glyphs to be used for the character codes,
wherein each of the plurality of glyphs is shared and used by different character codes based on the description data when rendering characters that correspond to the plurality of character codes acquired by the character recognition unit,
and wherein the description data is described based on the glyph selected by the selection unit for each character image in the document image.

15. The image processing apparatus according to claim 14, wherein the selection unit selects the glyph to be used for each character image from the plurality of glyphs, based on both of the character spacing and character row height of each character image in the document image.

16. An image processing apparatus comprising:
a character recognition unit configured to perform character recognition on a plurality of character images in a document image to acquire a character code corresponding to each character image;
a generation unit configured to generate an electronic document, wherein the electronic document includes the document image, a plurality of character codes acquired by the character recognition unit, a plurality of glyphs, and description data which indicates the glyphs to be used for the character codes,
wherein each of the plurality of glyphs is shared and used by different character codes based on the description data when rendering characters that correspond to the plurality of character codes acquired by the character recognition unit, and
wherein the glyphs are rendered in the lower part of a character row.

17. A method comprising:
acquiring a character code corresponding to each character image by performing a character recognition on a plurality of character images in a document image;
selecting a glyph to be used for each character image from a plurality of glyphs, based on both of a character width and character row height of each character image in the document image; and
generating an electronic document, wherein the electronic document includes the document image, a plurality of character codes acquired by performing the character recognition, the plurality of glyphs, and description data which indicates the glyphs to be used for the character codes,
wherein each of the plurality of glyphs is shared and used by different character codes based on the description data when rendering characters that correspond to the plurality of character codes acquired by performing the character recognition, and
wherein the description data is described based on the glyph selected by the selection unit for each character image in the document image.

18. The method according to claim 17, wherein each of the glyphs has a different width.

19. The method according to claim 17, wherein each of the glyphs indicates a simple shape.

20. The method according to claim 17, wherein each of the glyphs indicates a rectangular shape.

21. The method according to claim 17, wherein each of the glyphs indicates shape of blank character.

22. The method according to claim 17, wherein the generated electronic document further includes an average value of a distance between characters.

23. The method according to claim 17, wherein the generated electronic document includes a description for rendering glyphs corresponding to the plurality of character codes in a transparent color at a position that matches each character image in the document image.

24. A method comprising:
acquiring a character code corresponding to each character image by performing a character recognition on a plurality of character images in a document image;
selecting a glyph to be used for each character image from a plurality of glyphs, based on a character spacing of each character image in the document image; and
generating an electronic document, wherein the electronic document includes the document image, a plurality of character codes acquired by performing the character recognition, the plurality of glyphs, and description data which indicates the glyphs to be used for the character codes,
wherein each of the plurality of glyphs is shared and used by different character codes based on the description data when rendering characters that correspond to the plurality of character codes acquired by performing the character recognition, and
wherein the description data is described based on the glyph selected by the selection unit for each character image in the document image.

25. The method according to claim 24, wherein, in the selecting step, the glyph to be used for each character image is selected from the plurality of glyphs, based on both of the character spacing and character row height of each character image in the document image.

26. A method comprising
acquiring a character code corresponding to each character image by performing a character recognition on a plurality of character images in a document image; and
generating an electronic document, wherein the electronic document includes the document image, a plurality of character codes acquired by performing the character recognition, a plurality of glyphs, and description data which indicates the glyphs to be used for the character codes,
wherein each of the plurality of glyphs is shared and used by different character codes based on the description data when rendering characters that correspond to the plurality of character codes acquired by performing the character recognition, and
wherein the glyphs are rendered in the lower part of a character row.

27. A computer program stored in a non-transitory computer-readable storage medium, the computer program causing a computer to execute steps of:

acquiring a character code corresponding to each character image by performing a character recognition on a plurality of character images in a document image;

selecting a glyph to be used for each character image from a plurality of glyphs, based on both of a character width and character row height of each character image in the document image; and generating an electronic document, wherein the electronic document includes the document image, a plurality of character codes acquired by performing the character recognition, the plurality of glyphs, and description data which indicates the glyphs to be used for the character codes, wherein each of the plurality of glyphs is shared and used by different character codes based on the description data when rendering characters that correspond to the plurality of character codes acquired by performing the character recognition, and wherein the description data is described based on the glyph selected by the selection unit for each character image in the document image.

28. A computer program stored in a non-transitory computer-readable storage medium, the computer program causing a computer to execute steps of:

acquiring a character code corresponding to each character image by performing a character recognition on a plurality of character images in a document image;

selecting a glyph to be used for each character image from a plurality of glyphs, based on a character spacing of each character image in the document image; and generating an electronic document, wherein the electronic document includes the document image, a plurality of character codes acquired by performing the character recognition, the plurality of glyphs, and description data which indicates the glyphs to be used for the character codes, wherein each of the plurality of glyphs is shared and used by different character codes based on the description data when rendering characters that correspond to the plurality of character codes acquired by performing the character recognition, and wherein the description data is described based on the glyph selected by the selection unit for each character image in the document image.

29. A computer program stored in a non-transitory computer-readable storage medium, the computer program causing a computer to execute steps of:

acquiring a character code corresponding to each character image by performing a character recognition on a plurality of character images in a document image; and generating an electronic document, wherein the electronic document includes the document image, a plurality of character codes acquired by performing the character recognition, a plurality of glyphs, and description data which indicates the glyphs to be used for the character codes, wherein each of the plurality of glyphs is shared and used by different character codes based on the description data when rendering characters that correspond to the plurality of character codes acquired by performing the character recognition, and wherein the glyphs are rendered in the lower part of a character row.

\* \* \* \* \*